Nov. 5, 1963  G. L. WHITMAN  3,109,475
DETACHABLE TRACTION DEVICE FOR PNEUMATIC VEHICLE WHEELS
Filed Dec. 31, 1962  3 Sheets-Sheet 1

INVENTOR.
GEORGE L. WHITMAN
BY Charles V. Maguire
ATTORNEY

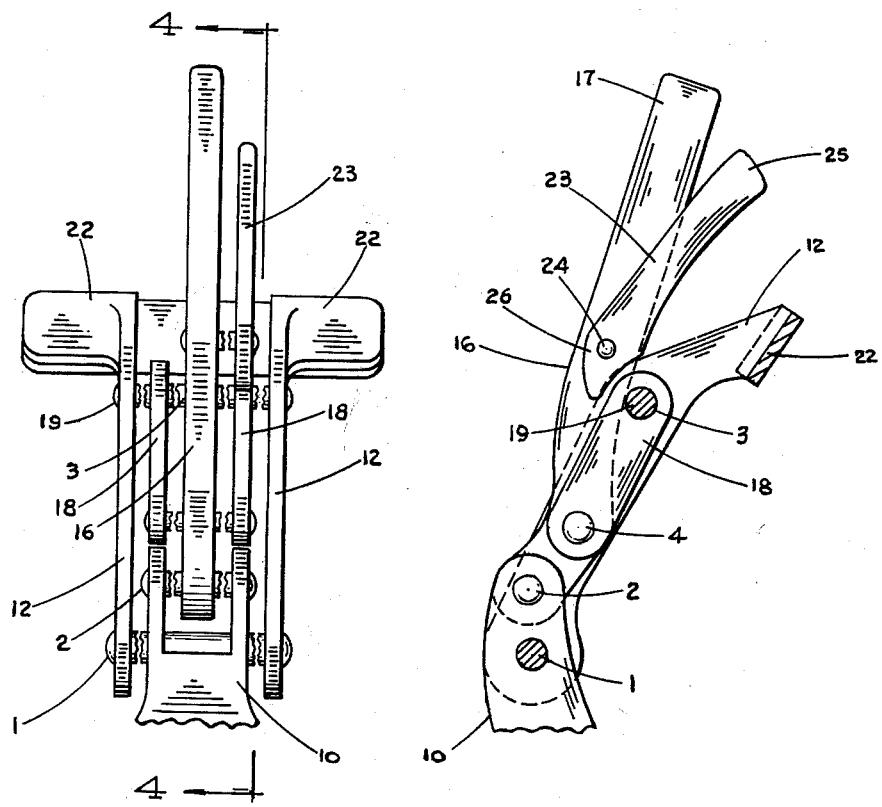

United States Patent Office

3,109,475
Patented Nov. 5, 1963

3,109,475
DETACHABLE TRACTION DEVICE FOR
PNEUMATIC VEHICLE WHEELS
George Louis Whitman, 17425 W. Fourteen Mile Road,
Birmingham, Mich.
Filed Dec. 31, 1962, Ser. No. 248,392
7 Claims. (Cl. 152—225)

This invention relates to apparatus for increasing the traction characteristics of a pneumatic vehicle wheel and releasably securing the device to the tire.

As a motorist knows, it is impractical to drive on city streets, roads, and highways, substantially free of snow, when chains or other apparatus attached to the wheels are needed only to get out of deep snow or mud. By use of the present device, it is only necessary to snap it on the tire for conditions requiring increased traction and snap it off for street or highway driving not requiring the additional traction. When the device is snapped on, it inextricably fits snugly to the tire in a clamping manner with levers presenting a toggle locking coaction in the compound linkage. It is well known that when a pneumatic tire is inflated, the side walls bias and bulge out in the form of an increased bight on the bottom section of the tire in contact with the ground. Since the traction of the wheel on the ground is obtained when the bottom section of the tire is so engaged, the coaction of the increased bight of the side walls operates to urge the linkage into increased toggle action of the device when the greatest force of the traction is required. An important feature of the present invention is the instant ease and simplicity of snapping the device on and off the tire so that it may be put to practical use only as required.

Among the objects of my invention are: to provide a novel and improved pneumatic vehicle tire traction device for augmenting traction characteristics of the tire; to provide a new and useful vehicle tire traction device having a toggle action compound linkage permitting small increments of positive locking action in mounted engagement but releasable retraction for dismounting; to provide a vehicle tire traction device having instant locking action against retraction and capable of instant unlocking action for detachment from the vehicle tire; to provide a vehicle tire traction device of the character described supplemented with an unlocking latch; to provide a vehicle tire traction device in which all the members can be stamped out in one stroke of a press and simple welding operations and assembly for quick and easy production; to provide a vehicle traction device having the novel arrangement of constantly urging the parts into locking engagement as the tire is biased by weight of the vehicle on the bottom traction portion of the tire; to provide a vehicle tire traction device with a transverse traction cleat and one inside fixed arm and one outside releasable clamping arm adapted to be secured against the axially inward portion of the tire bight; to provide a vehicle tire traction device having one inside fixed arm and one outside arm adapted to be swingable into instant positive locking position on the radially inward bight section of the tire and swingable into instant releasable dismounting position; to provide a vehicle tire traction device adapted to warp around the peripheral cross section of the tire and furnishing the two side arms with transverse gripping pads to securely lock the device against the bight of the side walls of the tire; to provide a traction device of the class described that is coactively efficient with the variant tire biasing function, economical to manufacture, durable in use and such further objects, advantages and capabilities inherently possessed by my invention, as will later more fully appear.

My invention further resides in the combination, and arrangement of parts illustrated in the accompanying drawings, and while I have shown therein a preferred embodiment, I wish it understood that the same is susceptible of modification and change without departing from the spirit of my invention.

In the drawings:

FIG. 1 is a side elevational view of a detachable traction device embodying my invention and shown in locked position to a pneumatic vehicle tire and the broken lines indicating dismounting application of the outside arm in retracted position.

FG. 2 is an edge view looking toward the left hand edge of FIG. 1.

FIG. 3 is a fragmentary edge view, partly in section, on a larger scale than FIG. 1 partially exploded to show axial relationship of the compound linkage members, the traverse gripping pads, and the unlocking latch for uncocking the toggle lock.

FIG. 4 is an enlarged detail view looking from the line 4—4 of FIG. 3 showing the positive locking action in mounted engagement to the tire.

Figures 1, 2:
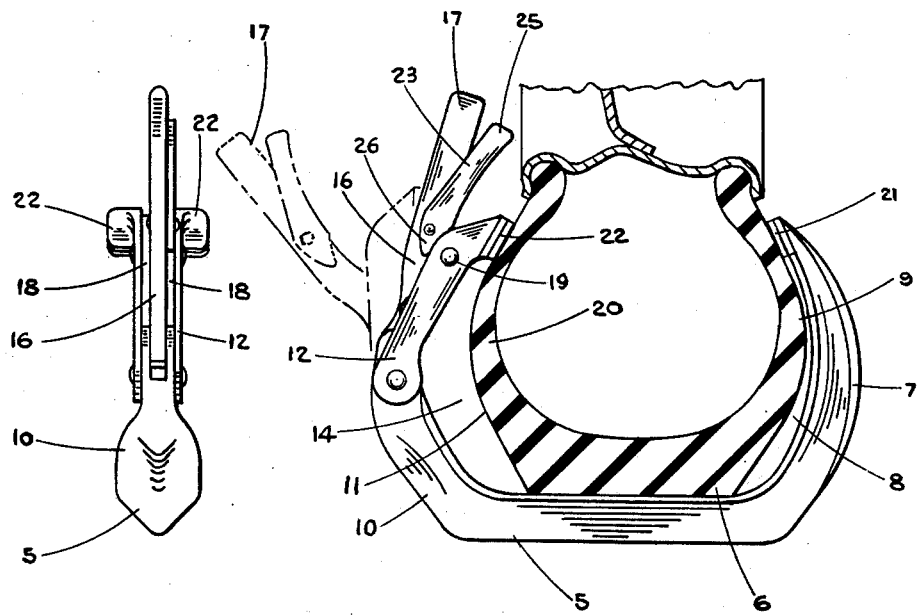
Figure 5:
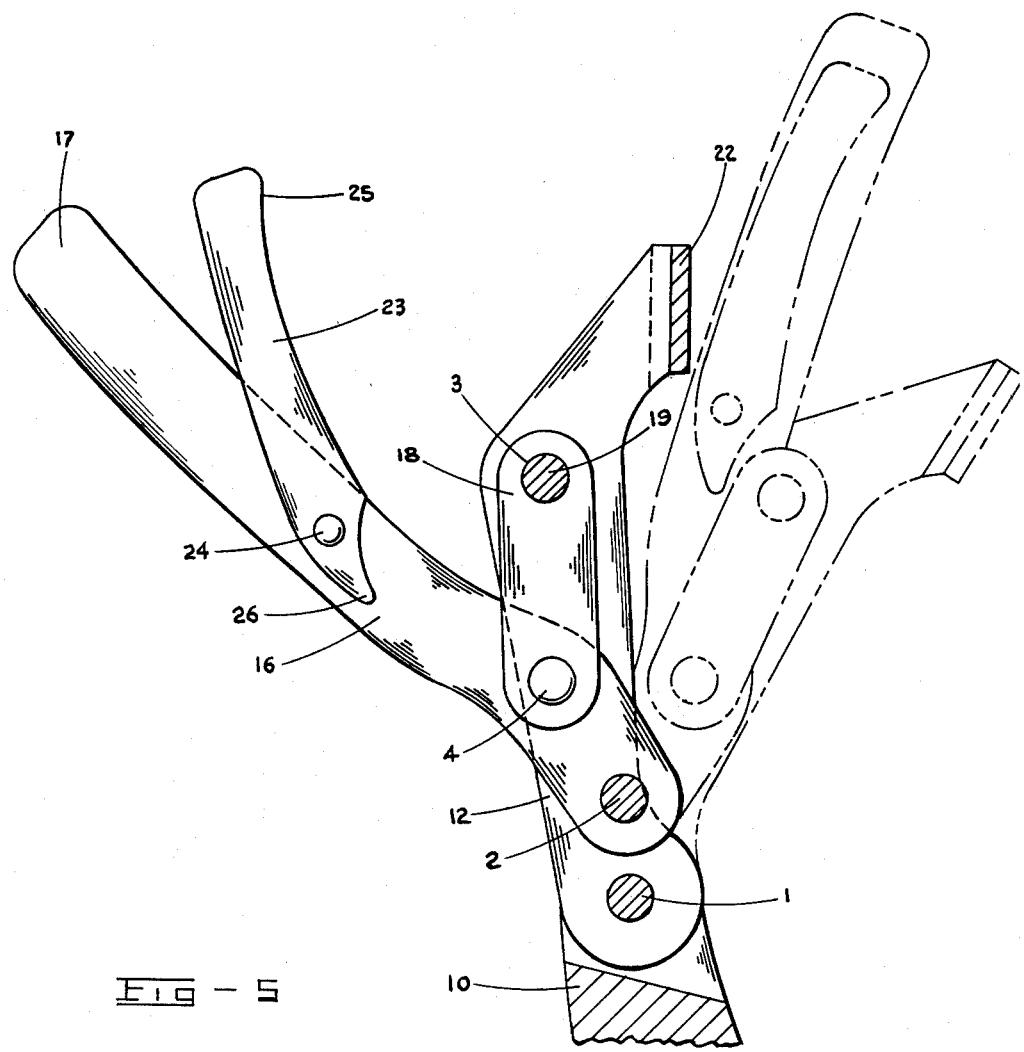
FIG. 5 is an enlarged detail view similar to FIG. 4 showing the unlocked action for dismounting the device from the tire and the broken lines showing the positive locking position.

In the form shown in the drawing, my invention comprises substantially a C-shaped gripping member having a transverse cleat 5 with a fixed upturned inside arm 7 extending radially inward from the tread of the tire 6 and having a transverse gripping pad 21 on its upper extremity, an outside arm 10 having a first lower axis 1 and a second upper axis 2, adapted to receive a compound linkage. Said compound linkage comprising a pivotal hook 12 swingably mounted about the first lower axis 1 on its lower extremity and having a transverse gripping pad 22 on its upper extremity and providing a third axis 3 proximate to the said transverse gripping pad 22, a toggle lever 16 swingably mounted about the second upper axis 2 on its lower extremity and having a handle portion 17 on its upper extremity and providing a fourth axis 4. A pivot stop pin 19 adapted to cooperate with the third axis 3, a toggle link 18 arranged to cooperate with the pivot stop pin 19 on its upper extremity and the toggle lever fourth axis 4 on its lower extremity.

A latch 23 swingably mounted to the toggle lever about the latch pivot 24, and a handle portion 25 provided at its upper extremity and having a foreshortened end 26 adapted to press against the upper extremity of the toggle link to force the pivotal hook into compression against the outside wall 11 of the tire 6 to uncock the triangular disposition of the toggle locking engagement.

The device presents a novel and unique combination of a triangular disposition of the components including a toggle locking arrangement in one of the legs of the triangle to inextricably interlock the outside transverse pad radially inward of the bight of the outside wall of the tire as the inside transverse pad on the inside arm coacts on the bight of the inside wall of the tire. The triangular disposition can best be seen by observing the axes 1, 2, and 3 in FIG. 4. When a force is applied against the transverse pad 22 from right to left in FIG. 4 it is overcome by the toggle combination, toggle lever 16 with toggle link 18, coacting in a straight line between axes 3 and 2. It should be noted that axis 4 is disposed slightly to the right of this straight line between axes 3 and 2 and axis 4 is held so disposed by the toggle lever 16 seating against pivot stop pin 19.

Mounting of the traction device to the tire is best understood by reference to FIG. 1 and is accomplished by positioning the inside arm 7 around the inside side wall of the tire 9 and wrapping the device around the tire so that the transverse cleat 5 is parallel to the tread of the tire 6 and then swinging the handle portion 17 of the toggle lever 16 toward the outside wall of the tire 11 until the toggle lever seats against the pivot stop pin 19. It is apparent that the clamping of the device to the tire is accomplished with the instantaneous snapping of the toggle lever into interlocking position.

The general configuration of the arms are such that one void 8 is manifest between the inside arm 7 and the inside sidewall 9 of the tire 6 and the second void 14 is manifest between the outside arm 10 with the compound linkage and the outside side wall 11 of the tire 6. These voids are an important requirement in the function of the device.

When the weight of the vehicle is resting on the bottom portion of the tire in contact with the ground, both the side walls of the tire bias outwardly forming an increased bight of the side walls. Since the traction is required in the said juxtapositioned bottom portion of the tire in contact with the ground, the increased bight of the side walls of the tire coact to increase the interlock of the transverse pads, thus further preventing the traction device from being extricated from the tire during this critical portion of the cycle.

Dismounting of the traction device from the tire is accomplished by manually compressing the latch handle 25 of the latch 23 toward the handle portion 17 of the toggle lever 16. This action forces the foreshortened end of the latch 23 against the toggle link 18 and via the third axis, in turn to the pivotal hook 12. This compresses the outside wall 11 of the tire 6 a sufficient amount to uncock the toggle action of the toggle link 18 with the toggle lever 16, thus allowing the pivotal hook to swing into open position. When the traction device was applied to a rear tire and the front wheels were statically blocked preventing forward movement of the vehicle, the traction device dug a hole eight inches in the ground. This operation caused the interlock to be so inextricably affixed to the tire that the latch was added to obtain instantaneous releasing action.

During the time that the vehicle wheel is turning and the traction device is attached to the tire, the centrifugal force generated tends to throw the traction device from the vehicle tire, but this is resisted by the compound linkage being further forcibly interlocked into toggle position.

What I claim is:

1. A detachable traction device for pneumatic vehicle wheels provided with a gripping member having a transverse cleat arranged to lie across the tread of the tire with tire engaging side arms adapted to extend radially inward from the tire tread, the inside arm disposed to form a fixed bight around the inside side wall of the tire, the outside arm presenting a first lower axis and a second upper axis employed to receive a compound linkage around the outside side wall of the tire, said compound linkage having a pivotal hook pivotally affixed to the first lower axis of the outside arm on one end and selectively operable to permit said detachable traction device to be attached to the tire in the open position and to form a bight around the outside side wall of the tire in the closed position, said pivotal hook having a third axis proximate its upper end, integral means for clamping the traction device to the vehicle tire comprising a toggle lever in the compound linkage pivotally affixed to the second upper axis of the said outside arm on one end and provided with a handle portion on the other end and presenting a fourth axis proximate and above the second axis, a toggle link in the compound linkage disposed to pivot on one end with the toggle lever about the fourth axis and on the other end with a pivotal hook about the third axis, a pivot stop pin securing the pivotal hook to the toggle link in the third axis and coacting with the toggle lever and the toggle link to inextricably lock the swivel hook in the bight around the outside side wall of the tire, whereby the detachable traction device is secured to the tire.

2. In a device as set forth in claim 1, vehicle tire biasing said pivotal hook into coacting engagement of said toggle link via said toggle lever and the toggle lever in turn via said pivot pin to interlock the detachable traction device onto the vehicle tire.

3. In a device as set forth in claim 1, the said inside arm having a transverse gripping pad on its radial inward extremity and the said pivotal hook having a transverse gripping pad on its radial inward extremity, whereby the gripping power of the said detachable tractor device is enhanced.

4. In a device as set forth in claim 1, a latch pivotally affixed to the said toggle lever and the upper end provided with a handle portion and the lower foreshortened end adapted to press against said toggle link via the third axis to force the pivotal hook to depress the vehicle tire and coact with the said toggle link to release the interlock of said compound linkage.

5. In a device as set forth in claim 2, said latch having a handle portion disposed to coact with the handle portion of the aforesaid toggle lever for manually compressing said latch handle portion toward said toggle lever handle portion whereby the interlock of the said compound linkage is released.

6. A detachable traction device for pneumatic vehicle wheels for increasing the traction characteristics of a vehicle tire provided with a C-shaped member adapted to wrap around the tread area and both side walls of the tire, said member having an external V-shaped cleat integral with a partially upturned outside arm and an upturned inside arm having a transverse gripping pad on its upper extremity, said partially upturned arm providing a first lower axis and a second upper axis, a pivotal hook arranged to swing about the first axis on the lower end and presenting a transverse gripping pad on its upper extremity and providing a third axis proximate the transverse gripping pad, integral means for clamping and unclamping the traction device to the vehicle tire comprising a toggle lever arranged to swing about the second upper axis on one end and having a handle portion on its upper end and further providing a fourth axis proximate and upwards the second axis, a pivot stop pin arranged to fit in the third axis in the pivotal hook, a toggle link adapted on one end to swing about said pivot stop pin and on the other end to swing about the fourth axis in the toggle lever, said toggle lever rendered capable of swinging inwardly toward the tire and coacting to stop against the pivot stop pin while forcing the said toggle link to press the pivotal hook into engagement with the sidewall of the tire and to swing outwardly away from the tire and pulling said toggle link to draw against the pivotal hook to force the pivotal hook out of engagement with the side wall of the tire.

7. In a device as set forth in claim 6, a latch pivotally affixed to the said toggle lever with the upper end provided with a handle portion to coact with the handle portion of said toggle lever to manually compress both handle portions toward one another, said latch provided with a lower foreshortened end arranged to press against said toggle link via the third axis to force the pivotal hook to depress the vehicle tire and coact with said toggle link to release the interlock of the pivotal hook via the toggle link and the toggle link via the toggle lever.

References Cited in the file of this patent

UNITED STATES PATENTS 2,652,092     Lantz                 Sept. 15, 1953
3,047,037     Frederick             July 31, 1962